Nov. 29, 1949  R. E. PENNELL  2,489,667
DEVICE FOR SLICING DOUGH
Filed July 16, 1946

INVENTOR.
Ruth E. Pennell
BY
ATTORNEY

Patented Nov. 29, 1949

2,489,667

UNITED STATES PATENT OFFICE 2,489,667

DEVICE FOR SLICING DOUGH

Ruth E. Pennell, Chelan, Wash.

Application July 16, 1946, Serial No. 683,847

1 Claim. (Cl. 107—21)

My present invention relates to an improved device for slicing dough and more particularly to a cutter box having a pivotally mounted knife for slicing dough such as is normally used in making ice box cookies.

According to my invention, the prepared dough is placed in the box, the ends capped and the box is placed in a refrigerator for the usual period of time. The box is then removed, and the end caps are replaced with a cap having means for extending the dough, and a cap for slicing the extended mixture.

In the accompanying drawings, I have illustrated one complete example of the physical embodiment of my invention according to the best mode I have thus far devised, but it will be understood that various changes and alterations may be made in the exemplified structure within the scope of the appended claim.

Figure 1:
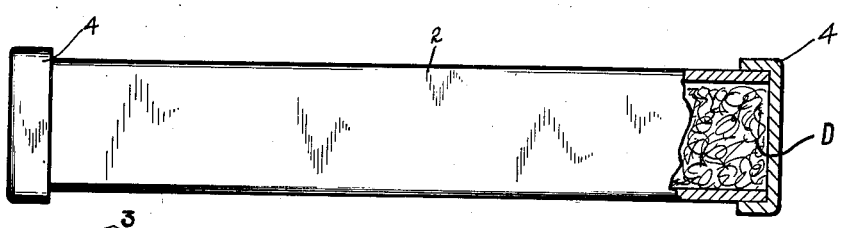
Figure 1 is a side elevational view of a container packed with the end caps to retain the dough within the container in which form it is kept in the refrigerator to be used as desired.
Figure 2:
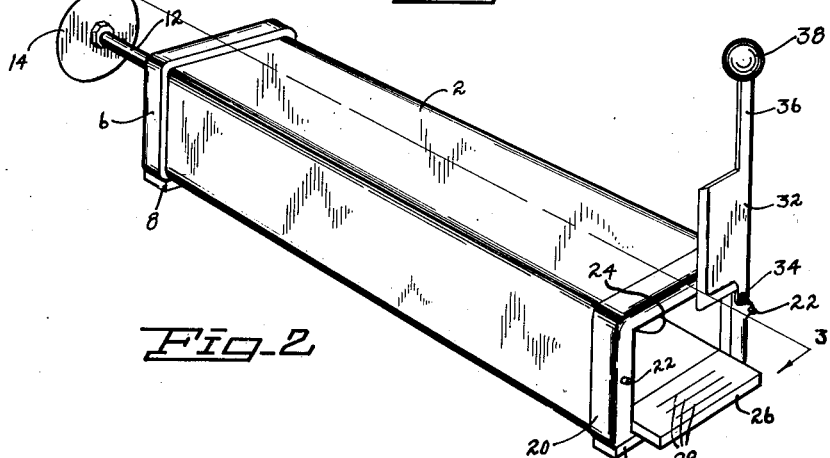
Figure 2 is a perspective view of the container having the original caps removed and replaced with a plunger cap and a cutter cap.
Figure 3:
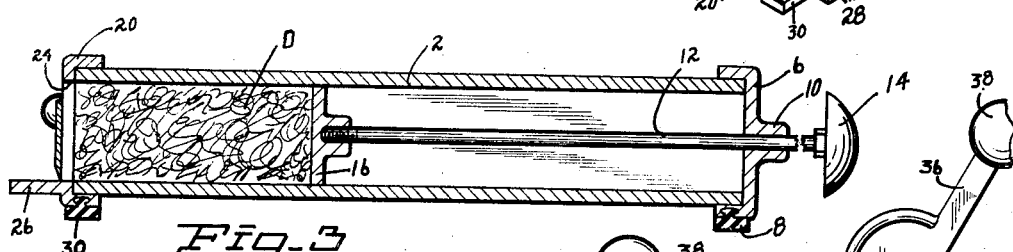
Figure 3 is a longitudinal sectional view taken on line 3—3 of Figure 2.

Referring now to the drawings wherein like characters indicate like parts, I have illustrated the present embodiment of my invention as comprising an elongated hollow box 2 having end caps or covers 4. Normally the dough D is prepared according to the recipe and the dough is placed in the box, and the ends are capped. After the usual time in the ice box or refrigerator, the box is removed and the caps are replaced.

The cap 6 is used for one end of the box and is provided with a rubber base 8. A central sleeve 10 on the cap 6 receives the rod 12 having a hand knob 14 for the plunger 16 which is pressed against the rear end of the stiffened body of dough D to extrude the opposite end.

The cap 20 is provided with outer pins 22 and a central opening 24 through which the dough is extended, and a plate 26 is formed with marking lines 28 to indicate the thickness of the slice to be cut. A rubber base 30 under the cap 20 prevents sliding of the box in conjunction with the base 8 of the cap 6.

A knife 32 is pivotally mounted at 34 on the cap 20 and the movement of the knife is limited by the pins 22. On the arm 36 of the knife, I utilize a ball 38 to facilitate the operation of the knife.

As the dough is extruded through to opening 24, the knife is successively pivoted to slice through the stiffened dough and as a result even and properly sliced cookies are prepared.

Figures 4, 5:
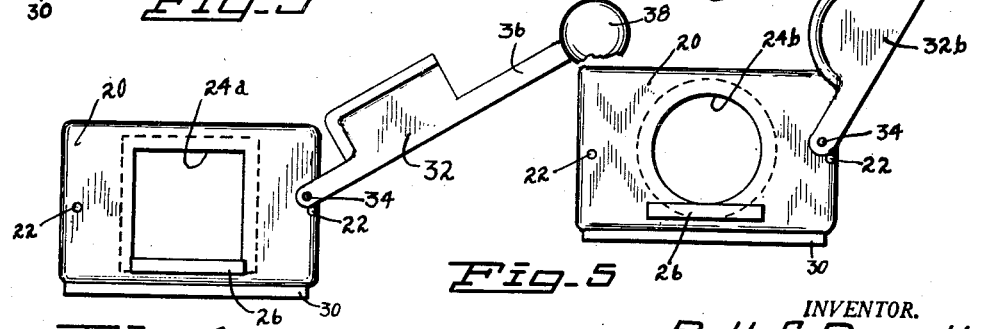
Figure 4 is an end view of the cutter cap showing a rectangular shape in the form of a square.
Figure 5 is also a modified form as applied to a round container.

In Figure 4, I have shown a modification of the cap 20 wherein the opening 24a is square rather than oblong as in 24, and in Figure 5, I have illustrated a circular opening 24b, and a semi-circular knife 32b.

By the use of my invention the dough may be stiffened and formed in the box, and then without removing the body of the dough, it may be extruded and sliced without handling the dough.

Having thus fully described my invention, what I claim as new, and desire to secure by Letters Patent is:

An elongated dough forming box having open ends, adapted to receive detachable closures to form a closed container, a cap for one end and a plunger carried by said cap for extruding dough from the other end, an open center cap for the other end, the said open center having its side and top edges aligned with the corresponding walls of the box, a plate secured to the lower wall of the latter cap and flush with the bottom wall of the box, indicia on the plate whereby the thickness of the slice to be cut may be determined, and a knife pivotally secured on one side of the said latter cap to slice the extruded dough.

RUTH E. PENNELL.

REFERENCES CITED

The following references are of record in the file of this patent:

UNITED STATES PATENTS

| Number | Name | Date |
| --- | --- | --- |
| 618,046 | Goodman | Jan. 17, 1899 |
| 876,130 | Barber | Jan. 7, 1908 |
| 1,005,128 | Blain | Oct. 10, 1911 |
| 1,009,953 | Boyle | Nov. 28, 1911 |
| 1,041,033 | Crist | Oct. 15, 1912 |
| 1,713,585 | Wolf | May 21, 1929 |
| 2,135,113 | Rehbein | Nov. 1, 1938 |